US008358701B2

(12) United States Patent
Chou et al.

(10) Patent No.: US 8,358,701 B2
(45) Date of Patent: Jan. 22, 2013

(54) SWITCHING DECODE RESOLUTION DURING VIDEO DECODING

(75) Inventors: Peter Hungye Chou, Sunnyvale, CA (US); Giovanni Agnoli, San Mateo, CA (US); Haitao Guo, San Jose, CA (US); Siladitya Bhattacharya, San Jose, CA (US); Vikrant Kasarabada, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 2103 days.

(21) Appl. No.: 11/107,987

(22) Filed: Apr. 15, 2005

(65) Prior Publication Data

US 2006/0233259 A1   Oct. 19, 2006

(51) Int. Cl.
*H04N 7/12* (2006.01)

(52) U.S. Cl. ................................. 375/240.25

(58) Field of Classification Search .......... 375/240.01–240.06, 240.12–240.16, 240.25–240.26
See application file for complete search history.

(56) References Cited

U.S. PATENT DOCUMENTS 5,832,124 A * 11/1998 Sato et al. ............... 382/238
5,963,257 A * 10/1999 Katata et al. ............ 375/240.11
6,055,012 A * 4/2000 Haskell et al. ................ 348/48
6,108,039 A * 8/2000 Linzer et al. ............. 375/240.11
6,233,017 B1 * 5/2001 Chaddha .................. 375/240.12
6,539,120 B1 * 3/2003 Sita et al. ................... 382/233
6,584,154 B1 * 6/2003 Wu ........................ 375/240.16

OTHER PUBLICATIONS

ISO/IEC 14496-2 "Information Technology—Coding of Audio-Visual Objects Part 2: Visual;" 2nd Edition, Dec. 1, 2001.
ISO/IEC 13818-2 "Information Technology—Generic Coding of Moving Pictures and Associated Audio Information: Video" Amendment 2: 4:2:2 Profile, 1st Edition, Dec. 15, 1997.

* cited by examiner

*Primary Examiner* — Nhon Diep
*Assistant Examiner* — Tracy Li
(74) *Attorney, Agent, or Firm* — Kenyon & Kenyon LLP (57) ABSTRACT

The decode resolution of a video signal can be varied during decoding by decoding a first portion of a video signal at a first resolution; determining a second resolution, different from the first resolution, at which a second portion of the video signal is to be decoded; adjusting one or more reference pictures associated with the video signal to correspond to the second resolution; and decoding the second portion of the video signal at the second resolution. The second resolution, at which the second portion of the video signal is decoded, can be selected from a plurality of predetermined decoding resolutions in response to the detection of a predetermined condition or in response to an input received from a user. Additionally, one or more reference pictures associated with the video signal can be up-sampled or down-sampled in at least one of the horizontal direction and the vertical direction.

25 Claims, 9 Drawing Sheets

| Picture | Decode Quality |
|---|---|
| I2 | High |
| I1 | High |
| I2 | Medium |
| P1 | Medium |
| P4 | Medium |
| P5 | Medium |
| I3 | High |
| P6 | Medium |
| P8 | Medium |

FIGURE 7

| Picture | Dependency |
|---|---|
| B0 | I2 |
| B1 | I2 |
| I2 | |
| B3 | I2, P5 |
| B4 | I2, P5 |
| P5 | I2 |
| B6 | I2, P5, P8 |
| B7 | I2, P5, P8 |
| P8 | I2, P5 |

SWITCHING DECODE RESOLUTION DURING VIDEO DECODING

BACKGROUND

The present disclosure relates to video coding devices and systems, and to decoding algorithms employed in conjunction with such devices.

Digital-based electronic media formats have become widely accepted. Digital compact discs (CDs) and audio files, such as MP3s (MPEG Audio—layer 3), are now commonplace. Video media, however, has been slower to transition to digital storage and digital transmission formats than audio media. One reason for the slower integration of digital video media formats into the marketplace is the volume of information required to accurately produce video of an acceptable quality from a digital representation. Additionally, encoding and decoding video in a digital format consumes substantial system resources and requires systems capable of processing information at high speeds. Further, the large amounts of information used to represent digital video also necessitate high-bandwidth transmission systems and high-capacity storage systems.

The development of faster computer processors, high-density storage media, and efficient compression and encoding algorithms have led to more widespread implementation of digital video media formats in recent years. The Digital Versatile Disc (DVD) has rapidly replaced video cassettes as the primary storage media for video due to its high image quality, very high audio quality, convenience, and added functionality. Further, the digital Advanced Television Standards Committee video transmission system is in the process of replacing the analog National Television Standards Committee transmission system.

Computer systems have been using various digital video formats for a number of years. Specifically, computer systems have employed many different methods for compressing and encoding or decompressing and decoding digital video. A video compression/decompression method, implemented using hardware, software, or a combination of hardware and software, is commonly referred to as a CODEC. A number of popular digital video compression and encoding systems have been developed based on the standards propounded by the Moving Picture Experts Group (MPEG), including the MPEG-1, MPEG-2, and MPEG-4 standards. Video CDs and early consumer-grade digital video editing systems use the MPEG-1 digital video encoding format. DVDs, video games, and some direct broadcast satellite systems are encoded in accordance with the MPEG-2 standard. MPEG-4 is now being used to deliver DVD (MPEG-2) quality video at lower data rates and smaller file sizes, and thus enables digital video playback on products ranging from satellite television systems to wireless devices.

The MPEG standards set forth methods for compressing a series of images, such as frames or fields, and for encoding the compressed images into a digital bit stream. When a video image is encoded in an MPEG system, the video image is divided into multiple pixel arrays, such as 8×8 pixel blocks or 16×16 pixel macroblocks. Each pixel array can then be independently compressed and encoded. During compression and encoding, a pixel array may be transformed from the spatial domain into one or more coefficients associated with the frequency domain.

When performing compression using an MPEG coder, such as a coder that is in compliance with the MPEG-1, MPEG-2, or MPEG-4 standard, images may be encoded using three picture types. Specifically, images may be encoded using I-pictures, P-pictures, and B-pictures. I-pictures are encoded with reference only to the information within the picture, and thus may be decoded without reference to any other pictures. Motion compensation cannot be performed with respect to I-pictures. P-pictures are encoded with reference to preceding pictures, and thus permit the use of motion compensation to provide for a greater degree of compression. B-pictures are encoded with reference to both preceding and succeeding pictures, and thus also permit the use of motion compensation. Because B-pictures are decoded using succeeding pictures, however, some reordering of the sequence of decoded pictures is required prior to display.

Digital video systems have also been developed based on standards other than those published by MPEG. For example, similar standards have been circulated by other organizations, such as the H.261-H.264 standards developed by the International Telecommunication Union. Additionally, proprietary codecs have been developed by other organizations and individuals. For example, Compression Technologies, inc. produces digital video compression tools based on the Cinepak codec and DivXNetworks produces a variety of applications based on the DivX codec. These standard and proprietary codecs represent only a few of the many different ways to compress and encode digital video information.

A compressed video signal is typically decoded by reversing the encoding process. As the steps taken to encode and compress the original sequence of images comprising the video signal are undone, in the reverse order, a reconstructed video sequence closely resembling the original video sequence is produced. The decoding process can be resource intensive if the original video sequence was comprised of high quality, or high resolution, video images.

SUMMARY

The need to implement video decoding strategies that will permit the use of reduced resolution decoding in order to increase decoding speed and reduce the demand on system resources is recognized. Further, the need to switch between different decoding resolutions during a decoding operation in response to system requirements or user direction is also recognized. Accordingly, the techniques and apparatus described here implement algorithms for decoding video information at a reduced resolution and for switching between different decoding resolutions during a decoding operation in response to system requirements or user direction.

In general, in one aspect, the techniques can be implemented to include decoding a first portion of a video signal at a first resolution; determining a second resolution, different from the first resolution, at which a second portion of the video signal is to be decoded; adjusting one or more reference pictures associated with the video signal to correspond to the second resolution; and decoding the second portion of the video signal at the second resolution.

The techniques also can be implemented to include selecting the second resolution from a plurality of predetermined decoding resolutions. The techniques can further be implemented such that determining the second resolution comprises automatically selecting in response to the detection of a predetermined condition. Additionally, the techniques can be implemented such that the predetermined condition is associated with the availability of one or more system resources.

The techniques also can be implemented such that determining the second resolution comprises selecting in response to an input received from a user. The techniques can further be implemented such that adjusting further comprises down-sampling a reference picture in at least one of a horizontal direction and a vertical direction. The techniques also can be implemented such that adjusting further comprises up-sampling a reference picture in at least one of a horizontal direction and a vertical direction. Further, the techniques can be implemented such that up-sampling further comprises duplicating image information representing a row or a column associated with the reference picture and inserting the duplicated image information into the reference picture to generate an up-sampled reference picture. Additionally, the techniques can be implemented such that up-sampling further comprises interpolating image information representing a row or a column associated with the reference picture from a plurality of rows or columns of the reference picture and inserting the interpolated image information into the reference picture to generate an up-sampled reference picture. The techniques can further be implemented such that adjusting further comprises identifying a resolution associated with a reference picture and determining a factor by which the reference picture can be adjusted to correspond to the second resolution.

In general, in another aspect, the techniques can be implemented to include processor electronics configured to decode a first portion of a video signal at a first resolution, determine a second resolution, different from the first resolution, at which a second portion of the video signal is to be decoded, adjust one or more reference pictures associated with the video signal to correspond to the second resolution, and decode the second portion of the video signal at the second resolution.

The techniques also can be implemented to include processor electronics configured to select the second resolution from a plurality of predetermined decoding resolutions. The techniques further can be implemented to include processor electronics configured to automatically select the second resolution in response to the detection of a predetermined condition. Additionally, the techniques can be implemented such that the predetermined condition is associated with the availability of one or more system resources. Further, the techniques can be implemented to include processor electronics configured to select the second resolution in response to an input received from a user.

The techniques also can be implemented to include processor electronics configured to adjust a reference picture by down-sampling the reference picture in at least one of a horizontal direction and a vertical direction. The techniques further can be implemented to include processor electronics configured to adjust a reference picture by up-sampling the reference picture in at least one of a horizontal direction and a vertical direction. Additionally, the techniques further can be implemented to include processor electronics configured to duplicate image information representing a row or a column associated with the reference picture and insert the duplicated image information into the reference picture to generate an up-sampled reference picture.

Further, the techniques can be implemented to include processor electronics configured to interpolate image information representing a row or a column associated with the reference picture from a plurality of rows or columns of the reference picture and insert the interpolated image information into the reference picture to generate an up-sampled reference picture. The techniques also can be implemented to include processor electronics configured to identify a resolution associated with a reference picture and determine a factor by which the reference picture can be adjusted to correspond to the second resolution.

In general, in another aspect, the techniques can be implemented to include decoding and displaying a first portion of a video signal in accordance with a first resolution; detecting the occurrence of a predetermined condition; determining in response to the detected predetermined condition a second resolution, wherein the second resolution is different from the first resolution; adjusting one or more reference pictures associated with the video signal to correspond to the second resolution; and decoding and displaying the second portion of the video signal in accordance with the second resolution. The techniques also can be implemented such that detecting the occurrence of the predetermined condition comprises determining that availability of a system resource has decreased below a level sufficient to decode the video signal at the first resolution in real time. Further, the techniques can be implemented to include determining a third resolution, wherein the third resolution can differ from the first resolution and the second resolution, and decoding and displaying a second video signal in accordance with the third resolution, wherein at least a portion of the first video signal and a portion of the second video signal are decoded and displayed simultaneously.

The techniques described in this specification can be implemented to realize one or more of the following advantages. For example, the techniques can be implemented such that reference pictures can be reused when the decode resolution associated with a video signal is switched during decoding, thus eliminating the need for additional decoding. The techniques also can be implemented to permit reference pictures to be quickly and efficiently converted to a new resolution during decoding. Further, the techniques can be implemented to reduce the demand on system resources, such as processors and frame stores, during the decoding of one or more video signals.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
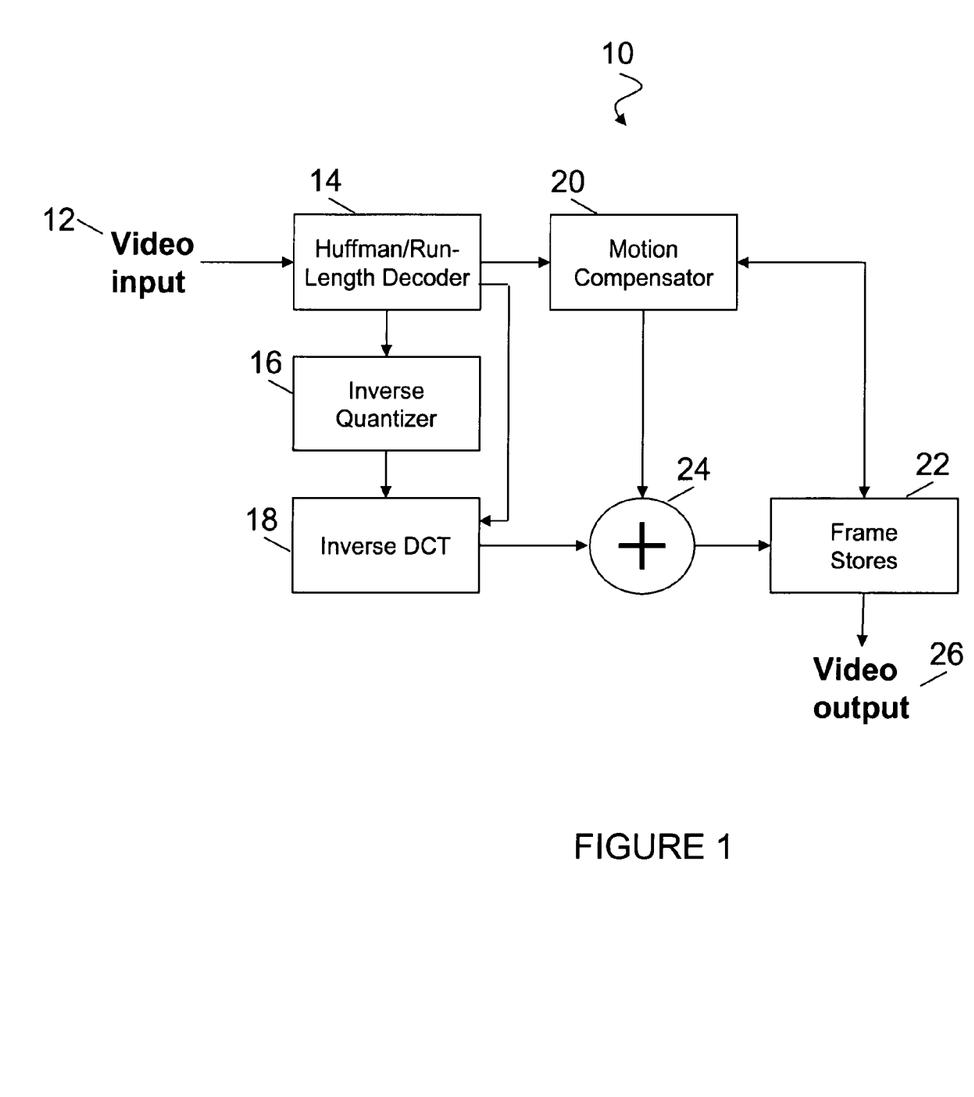
FIG. 1 is a block diagram of a decoder.

In an implementation, one or more video signals that comprise compressed and encoded video information, such as video information that has been compressed and encoded in accordance with the MPEG-2 standard, can be decoded at a reduced resolution to permit faster decoding and to reduce the demand placed on system resources by the decoding process. FIG. 1 presents an implementation of a decoder 10 that can be used to decode a video signal at a reduced resolution. In the decoder 10, a video signal comprising compressed and encoded video information is received through the video input 12. The video signal is passed to a Huffman/run-length decoder 14, which decodes the video signal.

The video information derived from the decoded video signal can include quantized discrete cosine transform (DCT) coefficients, motion vector information, and one or more flags associated with the video signal. The one or more flags can include a picture_coding_type flag that specifies whether the corresponding picture is an I-picture, a P-picture, or a B-picture. The one or more flags also can include a dct_type flag that indicates whether the dct_type associated with the corresponding macroblock is frame-DCT or field-DCT. Further, the one or more flags can include a frame_motion_type flag that indicates whether the corresponding macroblock was encoded using frame-based prediction or field-based prediction.

The quantized DCT coefficients are passed to the inverse quantizer 16, which reverses the quantization process executed in the encoder in order to produce DCT coefficients. The DCT coefficients and one or more flags are passed to the inverse DCT 18, which transforms the DCT coefficients from the frequency domain into the spatial domain. The DCT coefficients corresponding to P-pictures and B-pictures represent error correction information that is used to modify the predicted macroblocks produced by the motion compensator 20. The DCT coefficients corresponding to I-pictures represent the pixels that comprise macroblocks.

Additionally, motion vector information and one or more flags derived from the video signal are passed to the motion compensator 20. The motion compensator 20 uses the motion vector information and the one or more flags to read one or more macroblocks, or partial macroblocks, from the frame stores 22. The frame stores 22 contain one or more reference pictures associated with the video signal that the decoder 10 has previously decoded and stored. The motion compensator 20 uses the one or more macroblocks, or partial macroblocks, read from the frame stores 22 to form a predicted macroblock.

The motion compensator 20 passes each predicted macroblock to the adder 24, where it is combined with the corresponding DCT coefficients from the inverse DCT 18 to form a decoded macroblock. Each of the decoded macroblocks produced by the adder 24 represents a portion of the decoded video signal that can be provided to the video output 26 for display. Additionally, each of the decoded macroblocks that correspond to an I-picture or P-picture are stored in the frame stores 22 for subsequent use as reference pictures.

Although the sequence by which a video signal is decoded typically remains unchanged, the resolution at which a video signal is decoded by the decoder 10 can be varied by modifying one or more individual decoding operations. As such, a video signal can be decoded at any one of a plurality of resolutions, including high-quality (full resolution), medium-quality, or low-quality. Further, the resolution at which a video signal is decoded can be changed during the decoding process.

Figure 2:
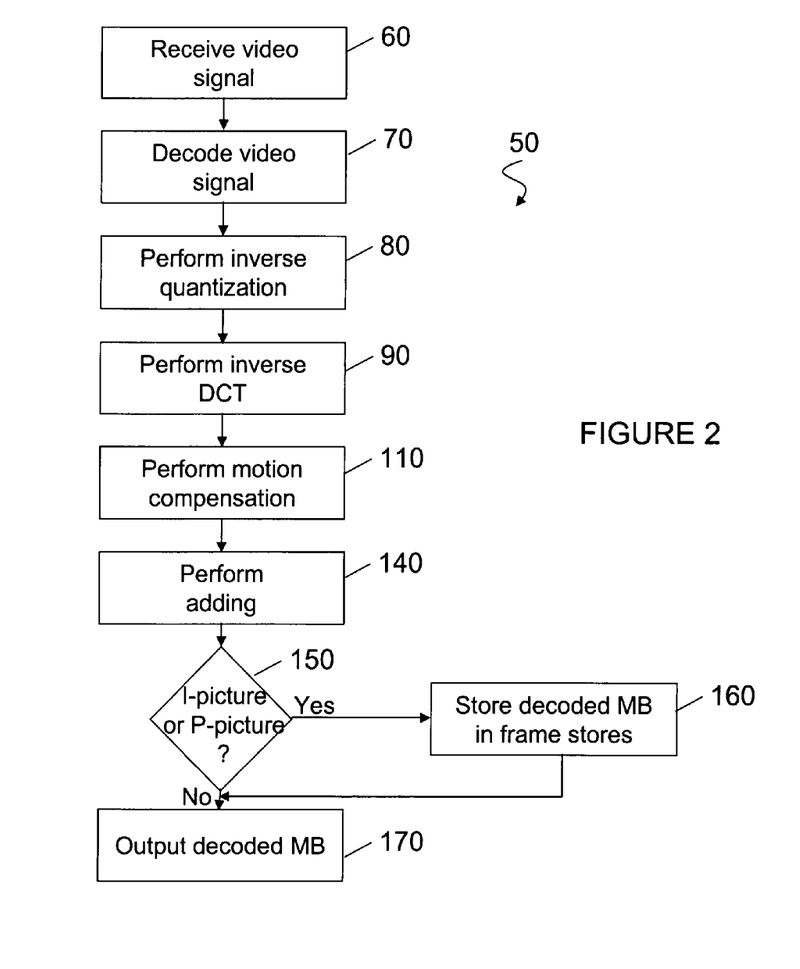
FIGS. 2-4 are flowcharts describing a video decoding process.

FIG. 2 describes a technique 50 for performing medium-quality decoding of a video signal that has been encoded at full resolution by down-sampling, or sub-sampling, the video information in one or more directions. Down-sampling is performed by eliminating a portion of the pixel information included in an original image. For example, an image can be down-sampled by a factor of two in the horizontal direction by removing each of the odd numbered columns of pixel information. An image also can be down-sampled in the vertical direction by removing one or more rows of pixel information. Down-sampling is performed in the spatial domain by discarding a portion of the image information, such as one or more pixels. The down-sampling performed in the frequency domain, such as during an inverse DCT operation, is similar to an averaging process and the information associated with a pair of adjacent pixels can be used to represent a single pixel.

In the technique 50 for decoding a video signal at medium-quality, a video signal comprising compressed and encoded video information is received by a decoder (60). Entropy decoding is performed on the video signal, such as by a Huffman/run-length decoder, to produce a decoded video signal (70). Quantized DCT coefficients derived from the decoded video signal are directed to an inverse quantizer, which reverses the quantization process executed in the encoder and produces DCT coefficients (80). The entropy decoding operation and the inverse quantization operation are carried out in the same manner regardless of the specified decoding resolution.

Figure 3:
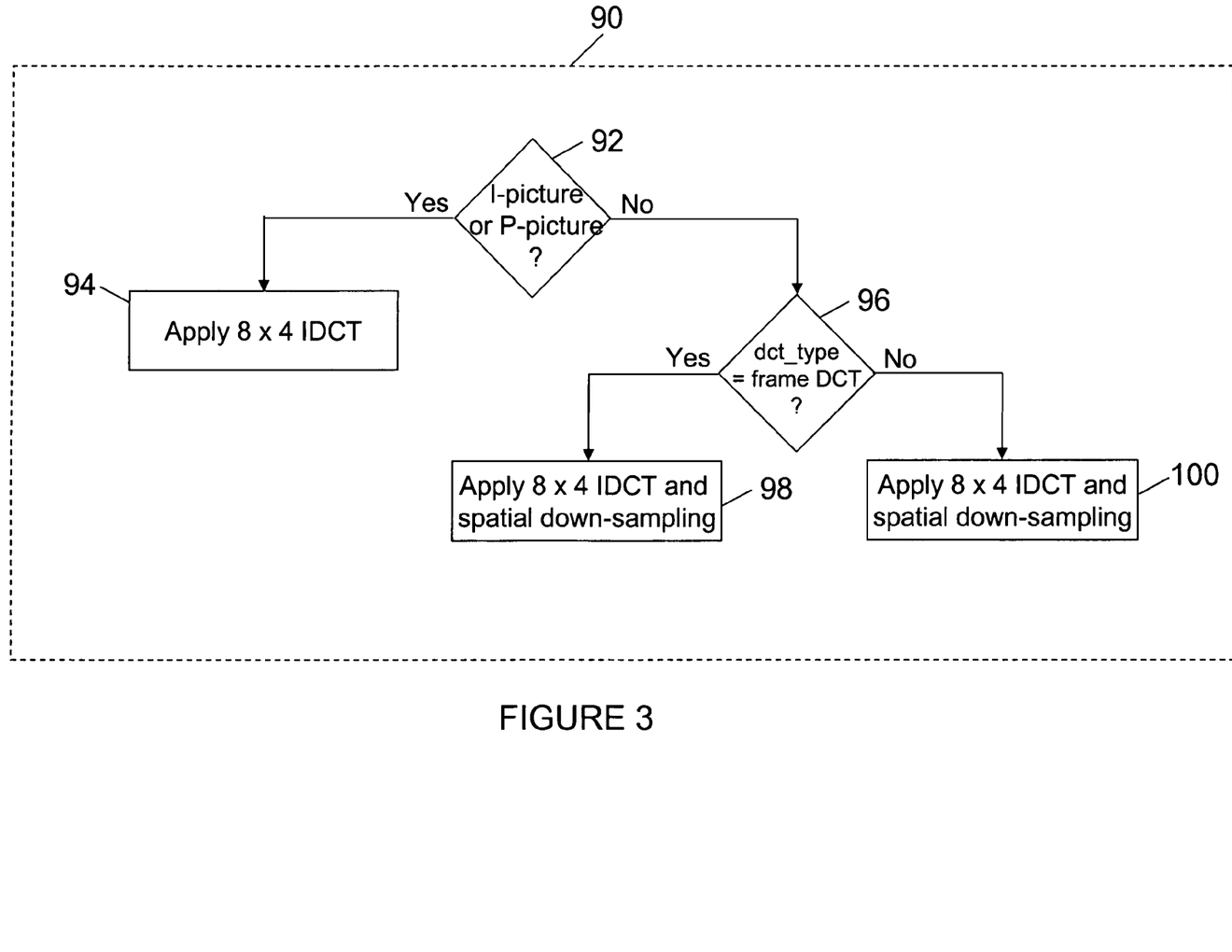

The DCT coefficients produced during the inverse quantization operation are directed, along with one or more flags, to an inverse DCT where they are subjected to a modified inverse transform operation (90). FIG. 3 describes the technique for performing the modified inverse transform operation. The picture_coding_type flag is referenced to determine whether the current picture is an I-picture or a P-picture (92). For each macroblock associated with an I-picture or a P-picture, an 8×4 inverse DCT operation is performed on the 8×4 left half of each of the 8×8 luminance blocks and each of the 8×8 chrominance blocks of DCT coefficients associated with that macroblock (94).

By performing the 8×4 inverse DCT operation on the left half of each block comprising the macroblock, only the lower frequency coefficients are transformed from the frequency domain into the spatial domain. As such, the macroblocks comprising I-pictures and P-pictures are down-sampled in the horizontal direction by a factor of two, which results in the macroblocks being decoded to half size. Because I-pictures and P-pictures are used as reference pictures during the decoding of subsequent pictures, they are not down-sampled in the vertical direction and both fields are thus decoded. As medium-quality decoding results in a one-quarter resolution output, however, only the top field of each of the reference pictures is selected for display.

If the picture_coding_type flag indicates that the current picture is a B-picture, a non-reference picture, the dct_type flag is referenced to determine whether it is set to frame-DCT or field-DCT (96). If the dct_type flag is set to frame-DCT, an 8×4 inverse DCT operation is performed on the 8×4 left half of each of the 8×8 luminance blocks and each of the 8×8 chrominance blocks of DCT coefficients associated with that macroblock. The 8×4 inverse DCT operation applied to each block results in an 8×4 sub-block of pixel information in the spatial domain. Each of the rows of pixels in the 8×4 sub-block of pixels that correspond to the bottom field are then discarded to generate a 4×4 sub-block of pixels that correspond only to the top field (98).

If the picture_coding_type flag indicates that the current picture is a B-picture and the dct_type flag is set to field-DCT, an 8×4 inverse DCT is performed on the 8×4 left half of the 8×8 luminance blocks that correspond to the top field. Additionally, an 8×4 inverse DCT is performed on the 8×4 left half of the 8×8 chrominance blocks of DCT coefficients associated with the macroblock. As described above, the inverse DCT operation applied to each chrominance block results in an 8×4 sub-block of pixels in the spatial domain. Each of the rows of pixels in the 8×4 sub-block of pixels that correspond to the bottom field are then discarded to generate a 4×4 sub-block of pixels that correspond only to the top field. The two 8×8 luminance blocks of DCT coefficients that correspond to the bottom field are ignored (100). As such, only the lower frequency coefficients corresponding to the top field are transformed into the spatial domain.

The motion vector information derived from the decoded video signal is also processed differently than it is during a typical full resolution decoding operation. During reduced resolution decoding, the motion vector information passed to the motion compensator is scaled in accordance with the scaling that is applied to the DCT coefficients processed in the inverse DCT. As described above, the motion vector information and one or more flags derived from the decoded video signal are directed to the motion compensator (110). The modified motion compensation operation for reduced resolution decoding is further described with respect to FIG. 4.

Figure 4:
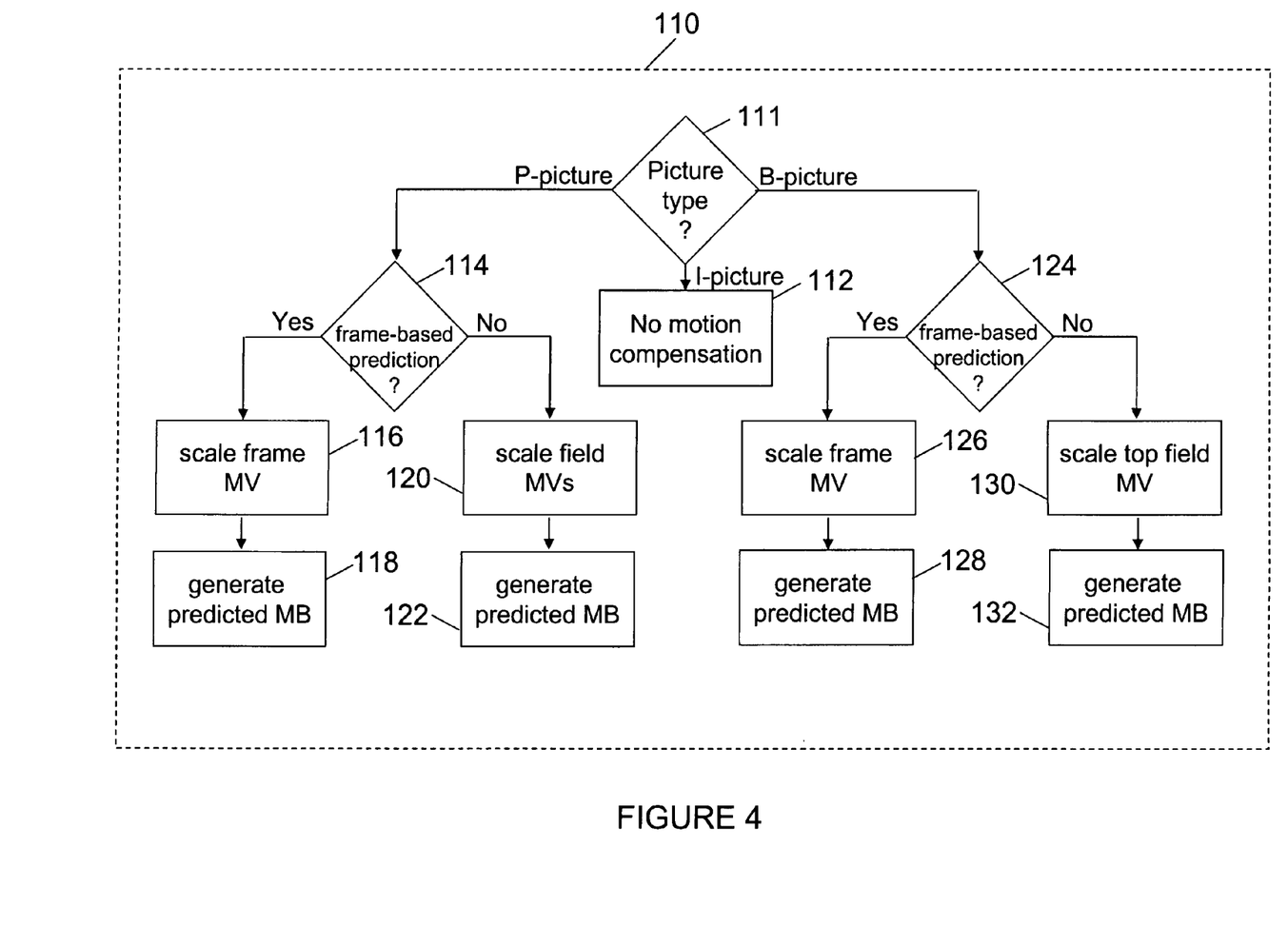

The picture_coding_type flag is referenced to determine whether the current picture is a P-picture, a B-picture, or an I-picture (111). If the current picture is an I-picture, no motion compensation is performed (112). If the current picture is a P-picture, the frame_motion_type flag is referenced to determine whether the corresponding macroblock was encoded using frame-based prediction or field-based prediction (114). If the frame_motion_type flag indicates frame-based prediction, the motion compensator scales the horizontal component of the frame motion vector by one-half (116). After scaling, the frame motion vector is represented in one-quarter pixel terms, which corresponds to the one-quarter resolution decode being performed during medium-quality decoding. A one-quarter pixel prediction or interpolation procedure using the scaled frame motion vector can then be applied to one or more of the half-sized reference pictures included in the frame stores to obtain the correct predicted macroblock (118).

Similarly, if the picture_coding_type flag is set to P-picture and the frame_motion_type flag indicates field-based prediction, the motion compensator scales the horizontal component of both the top field motion vector and the bottom field motion vector by one-half (120). After scaling, the top field and bottom field motion vectors are represented in one-quarter pixel terms and a one-quarter pixel prediction or interpolation procedure using the scaled top and bottom field motion vectors can then be applied to one or more of the half-sized reference pictures included in the frame stores to obtain the correct predicted macroblock (122).

If the picture_coding_type flag is set to B-picture, the frame_motion_type flag is referenced to determine whether the corresponding macroblock was encoded using frame-based prediction or field-based prediction (124). If the frame_motion_type flag indicates frame-based prediction, the motion compensator scales the horizontal component of the frame motion vector by one-half (126). After scaling, the frame motion vector is represented in one-quarter pixel terms and a one-quarter pixel prediction or interpolation procedure using the scaled frame motion vector can then be applied to one or more of the half-sized reference frames included in the frame stores to obtain the correct predicted macroblock (128). Because the predicted macroblock produced by the motion compensator corresponds to a B-picture, however, it is only formed for the top field, or the even rows, of the current frame.

If the picture_coding_type flag is set to B-picture and the frame_motion_type flag indicates field-based prediction, the motion compensator scales the horizontal component of the top field motion vector by one-half (130). The bottom field motion vector is ignored. After scaling, the top field motion vector is represented in one-quarter pixel terms and a one-quarter pixel prediction or interpolation procedure using the scaled top field motion vector can then be applied to one or more of the half-sized reference frames included in the frame stores to obtain the correct predicted macroblock (132).

Each of the predicted macroblocks produced by the motion compensator is combined with the corresponding macroblock correction information produced by the inverse DCT to form a decoded macroblock (140). Additionally, the picture_coding_type flag is referenced to determine whether a decoded macroblock is associated with an I-picture or P-picture (150). Each of the decoded macroblocks that is associated with an I-picture or P-picture is further stored in the frame stores so that it may be used to form subsequent predicted macroblocks (160). Each of the decoded macroblocks is then output for display. As each of the decoded macroblocks associated with a reference frame includes information associated with both the top field and the bottom field, however, only the information associated with the top field is output for display (170).

The techniques for performing the modified inverse transform operation and the modified motion compensation operation described with respect to FIGS. 3-4 can be adapted to further permit decoding at other resolutions by specifying a different scaling factor. For example, the inverse transform operation can be modified to further down-sample the DCT coefficients in order to perform low-quality decoding.

For each macroblock associated with an I-picture or a P-picture, an 8×2 inverse DCT is first performed on the DCT coefficients corresponding to the first eight rows and first two columns of each of the 8×8 luminance and 8×8 chrominance blocks of DCT coefficients associated with the macroblock. The other DCT coefficients can be ignored. By performing the 8×2 inverse DCT, only the lowest frequency coefficients are transformed from the frequency domain into the spatial domain. Each field of the resulting 8×2 sub-blocks of pixels is then independently down-sampled in the vertical direction by a factor of two to produce 4×2 sub-blocks of pixels. As such, the macroblocks corresponding to I-pictures and P-pictures are down-sampled in the horizontal direction by a factor of four and in the vertical direction by a factor of 2, which results in the reference pictures being decoded to one-eighth size.

For each macroblock associated with a B-picture, the dct_type flag is referenced to determine whether the dct_type flag is set to frame-DCT or field-DCT. If the dct_type flag is set to frame-DCT, an 8×2 inverse DCT is performed on each of the 8×8 luminance and 8×8 chrominance blocks of DCT coefficients. The 8×2 inverse DCT operation applied to each block results in an 8×2 sub-block of pixel information in the spatial domain. Each of the rows that correspond to the bottom field in each of the resulting 8×2 sub-blocks of pixel information are then discarded to generate 4×2 sub-blocks of pixel information. The 4×2 sub-blocks of pixel information are then further down-sampled in the vertical direction by a factor of 2 to produce 2×2 sub-blocks of pixel information that correspond only to the top field.

If the dct_type flag is set to field-DCT, a 4×2 inverse DCT is performed on the DCT coefficients corresponding to the first four rows and first two columns of the 8×8 luminance blocks that correspond to the top field. Additionally, an 8×2 inverse DCT operation is performed on the 8×8 chrominance blocks associated with the macroblock. The 8×2 inverse DCT operation applied to each of the chrominance blocks results in an 8×2 sub-block of pixel information in the spatial domain. Each of the rows that correspond to the bottom field in each of the resulting 8×2 sub-blocks of pixel information are then discarded to generate 4×2 sub-blocks of pixel information. The 4×2 sub-blocks of pixel information, which comprise both luminance and chrominance information, are then further down-sampled in the vertical direction by a factor of 2 to produce 2×2 sub-blocks of pixel information that correspond only to the top field. The two 8×8 blocks of DCT coefficients that correspond to the bottom field are ignored.

As with the medium-quality decode described above, the motion vector information is also scaled in accordance with the scaling applied to the macroblocks during the inverse transform operation. If the picture_coding_type flag is set to P-picture and the frame_motion_type flag indicates frame-based prediction, the horizontal component of the frame motion vector is scaled by one-fourth and the vertical component of the frame motion vector is scaled by one-half. After scaling, the frame motion vector is represented in one-eighth pixel terms, which corresponds to the one-eighth resolution decode being performed during low-quality decoding. However, as only one-quarter pixel accuracy is accounted for, a one-quarter pixel prediction or interpolation procedure using the scaled frame motion vector is applied to one or more of the one-eighth sized reference frames included in the frame stores to obtain the correct predicted macroblock.

Similarly, if the picture_coding_type flag is set to P-picture and the frame_motion_type flag indicates field-based prediction, the horizontal component of both the top field motion vector and the bottom field motion vector is scaled by one-fourth and the vertical component of both the top field motion vector and the bottom field motion vector is scaled by one-half. After scaling, the top field and bottom field motion vectors are represented in one-eighth pixel terms. As described above, however, a one-quarter pixel prediction or interpolation procedure using the scaled top field and bottom field motion vectors is applied to one or more of the one-eighth sized reference frames included in the frame stores to obtain the correct predicted macroblock.

If the picture_coding_type flag is set to B-picture and the frame_motion_type flag indicates frame-based prediction, the horizontal component of the frame motion vector is scaled by one-fourth and the vertical component of the frame motion vector is scaled by one-half. After scaling, the frame motion vector is represented in one-eighth pixel terms and a one-quarter pixel prediction or interpolation procedure using the scaled frame motion vector is applied to one or more of the one-eighth sized reference frames included in the frame stores to obtain the correct predicted macroblock. As described above, the predicted macroblock is only formed for the top field, or even rows, of the current picture.

If the picture_coding_type flag is set to B-picture and the frame_motion_type flag indicates field-based prediction, the horizontal component of the top field motion vector is scaled by one-fourth and the vertical component of the top field motion vector is scaled by one-half. The bottom field motion vector is ignored. As such, the top field motion vector is represented in one-eighth pixel terms and a one-quarter pixel prediction or interpolation procedure using the scaled top field motion vector is applied to one or more of the one-eighth sized reference frames included in the frame stores to obtain the correct predicted macroblock.

As described above, a wide variety of scaling factors can be used to decode a video signal at a reduced resolution. Because reduced resolution decoding consumes fewer system resources and can be accomplished more quickly than full resolution decoding, it is less burdensome for a system configured to practice the techniques described above to simultaneously decode multiple video signals.

Figure 5:
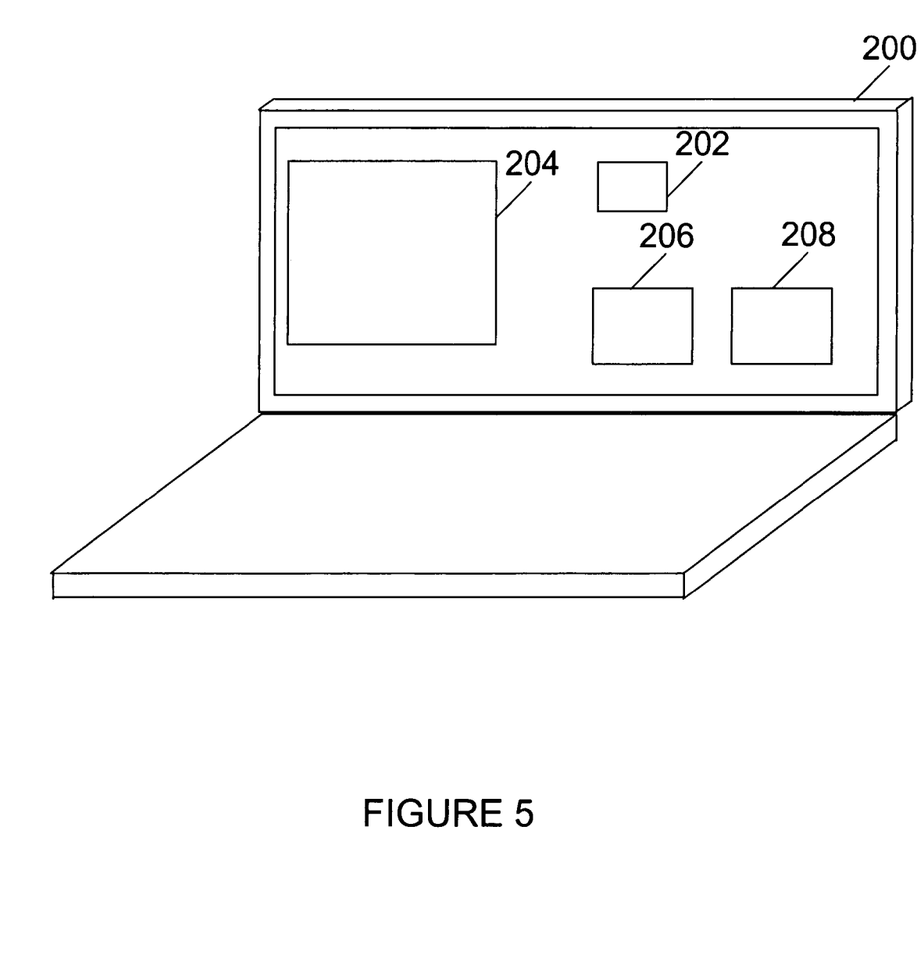
FIG. 5 depicts a system simultaneously decoding a plurality of video signals.

A system 200 displaying multiple decoded video signals is presented in FIG. 5. The decode and display resolution corresponding to each of the video signals displayed by the system 200 can be individually configured by either the user or the system 200. For example, if four video signals are simultaneously decoded, the first video signal 202 can be decoded at low-quality, the second video signal 204 can be decoded at high-quality, and the third video signal 206 and fourth video signal 208 can each be decoded at medium-quality. In order to optimize the decoding process and permit the simultaneous decoding of a greater number of video signals, the lowest acceptable decode quality for each video signal can be selected.

In an implementation, the system 200 also can be configured to switch between the available levels of decode quality at any time during the decoding process. The decision to switch the decoding of a video signal from a first decode quality to a second decode quality can be made by a user, such as during an editing operation. Alternatively, the system 200 can be configured to automatically switch the decoding of a video signal from a first decode quality to a second decode quality in response to the detection of one or more predetermined conditions, such as exceeding a processor usage threshold.

For example, if the system resources required to continue decoding the second video signal 204 at high-quality are no longer available, the system 200 can either automatically switch the decoding of the second video signal 204 to a lower quality or prompt the user to select a new decoding configuration. Further, a high-quality image is typically displayed when the playback of a decoded video signal is paused. Thus, if playback of the third video signal 206 is paused, the quality of the image displayed during the pause can be switched from medium-quality to high-quality. When playback of the third video signal 206 is resumed, decoding can be switched back to medium-quality.

Figure 6:
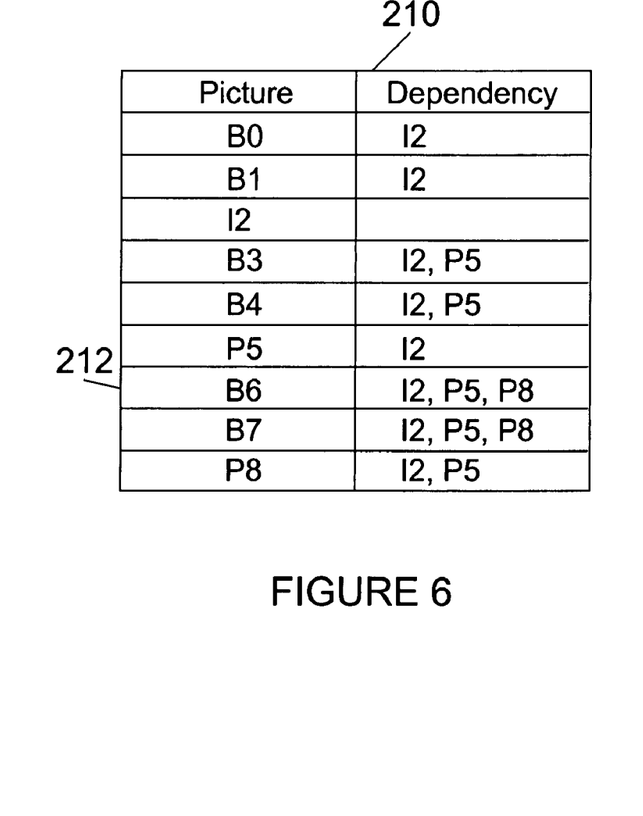
FIG. 6 presents a portion of a dependency reference list.

The system 200 tracks the interframe dependencies associated with a video signal during a decoding operation and maintains a dependency reference list identifying the pictures that must be provided to the decoder in order to decode any particular picture. FIG. 6 presents a portion of the dependency reference list 210 associated with the fourth video signal 208. When the system 200 queues picture B6 associated with the fourth video signal 208 for decoding, the system 200 looks up the entry 212 that corresponds to the picture B6 in the dependency reference list 210 and identifies any interframe dependencies.

Figure 7:
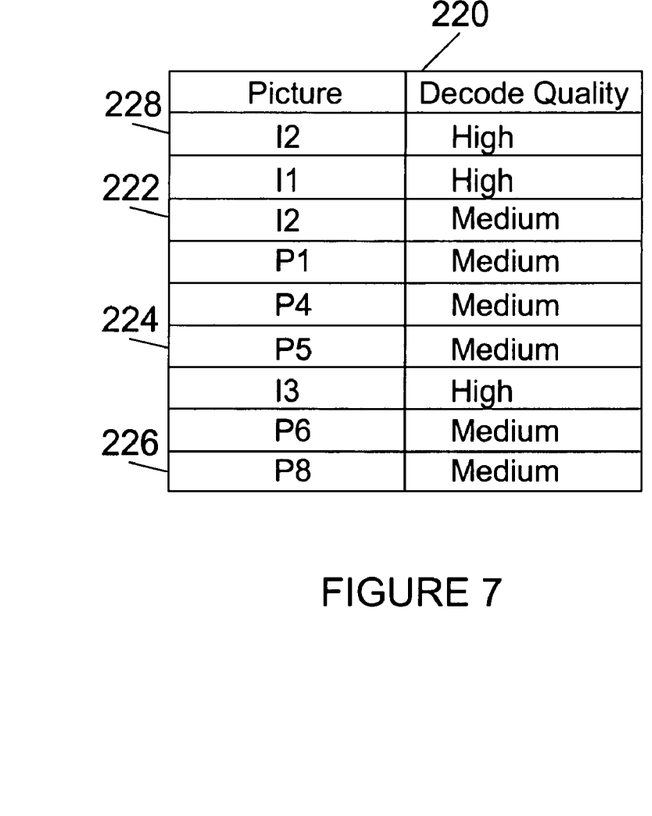
FIG. 7 presents a portion of a cache reference list.

The entry 212 that corresponds to the picture B6 in the dependency reference list 210 indicates that pictures I2, P5, and P8 are needed to decode picture B6. During decoding, the system 200 maintains a cache of decoded reference pictures that can be used to decode subsequent pictures. Because multiple portions of a video signal can be decoded at different resolutions, the system 200 also tracks the resolution at which each of the reference pictures was decoded. FIG. 7 presents a portion of a cache reference list 220 associated with the fourth video signal 208 that identifies which reference pictures are available to the system 200 and the resolution at which each of those reference pictures was decoded.

For example, in order to decode picture B6 at medium-quality, the system 200 must use picture I2 at medium-quality, P5 at medium-quality, and P8 at medium-quality. Therefore, the system 200 consults the cache reference list 220 and determines that reference pictures I2 222 is available at medium-quality, reference picture P5 224 is available at medium-quality, and reference picture P8 226 is available at medium-quality. As such, picture B6 can be decoded at medium-quality without decoding any additional reference pictures.

Alternatively, if reference picture I2 222 at medium-quality was not available, the system 200 could convert reference picture I2 228 from a high-quality reference picture to a medium-quality reference picture. When the decoding quality of a video signal is decreased during the decoding process, the existing reference pictures must be modified to comport with the newly specified decoding quality. Because the reference pictures are expressed as pixel information in the spatial domain and because the transition period between decoding qualities is very short, the reference pictures can be down-sampled to create reference pictures of the proper resolution.

Figure 8A:
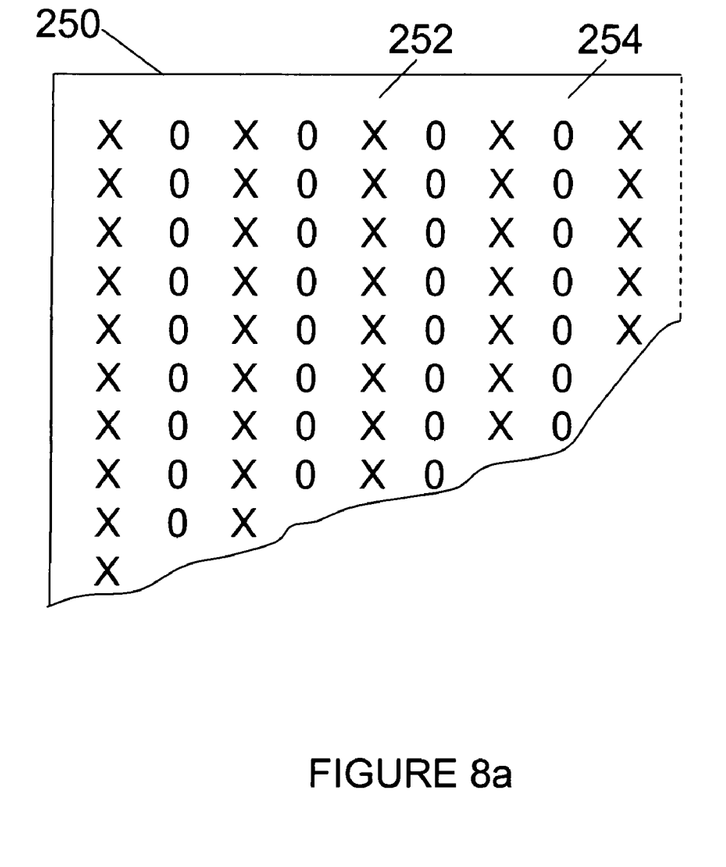
FIGS. 8a and 8b depict picture down-sampling.
Figure 8B:
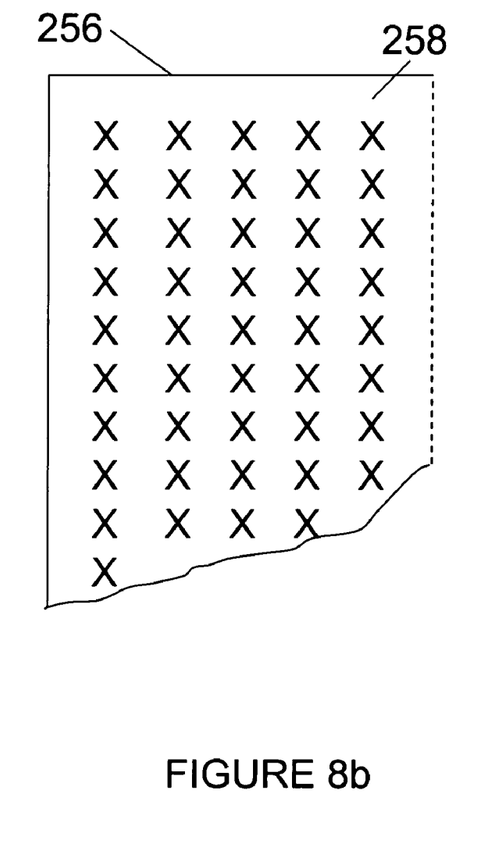

FIG. 8a presents a portion of a reference picture 250 that was decoded at high-quality, such as reference picture I2 228, that must be down-sampled when the decoding quality associated with a video signal is reduced from high-quality to medium-quality. Prior to down-sampling, the reference picture 250 includes alternating columns of pixels indicated by Xs, such as column 252, and columns of pixels indicated by 0s, such as column 254. In order to be used as a reference picture for medium-quality decoding, the reference picture 250 must be down-sampled by a factor of two in the horizontal direction to create a half-sized reference picture. Every second column of pixels, such as the columns of pixels indicated by 0s, are therefore eliminated from the reference picture 250. FIG. 8b presents the resulting one-half sized reference picture 256, which is comprised only of columns of pixels indicated by Xs, such as column 258.

Similarly, if the decoding quality is reduced from high-quality to low-quality, both the top field and the bottom field comprising a reference picture can be down-sampled by four in the horizontal direction and two in the vertical direction to create the one-eighth sized reference pictures utilized in low-quality decoding. In this manner, pixels from both the top field and the bottom field are retained and are thus available for use in subsequent predictions.

Alternatively, when the decoding quality is increased during the decoding process, the system 200 also requires reference pictures of the appropriate resolution. When the decoding quality is increased, however, reference pictures of a visually appealing quality can not be obtained by directly converting reference pictures that were decoded at a lower quality. Therefore, the appropriately sized reference pictures are generated by repeating the decoding process for each necessary reference picture at the new decoding quality. Because only a limited number of reference pictures need to be decoded at the higher quality, the new reference pictures can be generated without incurring an excessive delay.

Figure 9A:
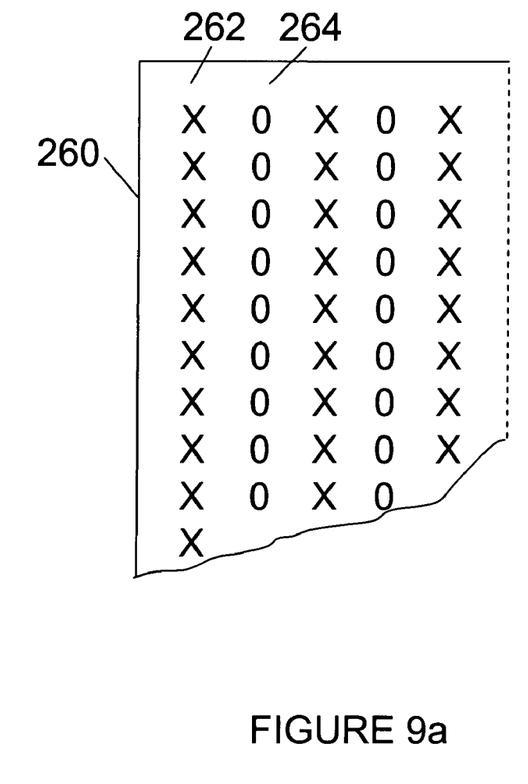
FIGS. 9a and 9b depict picture up-sampling.
Figure 9B:
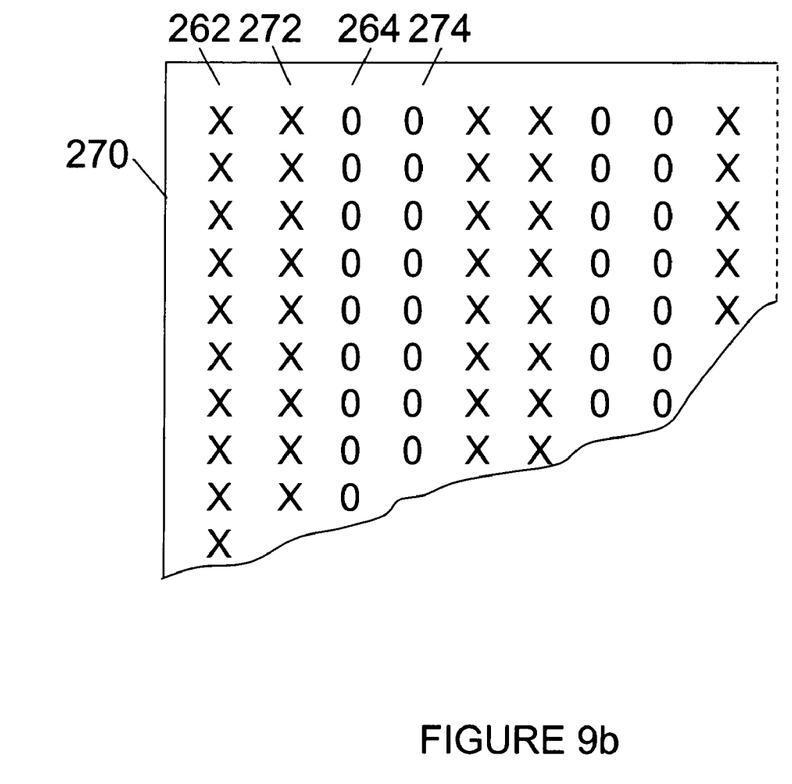

In another implementation, the lower quality reference pictures can be directly converted to the appropriate resolution without additional decoding. Because the effect of the lower quality reference pictures on the decoded signal is eliminated after a few pictures, the increase in decoding efficiency may be sufficient to compensate for any resulting image distortion. FIG. 9a presents a portion of a one-half sized reference picture 260 that must be up-sampled when the decoding quality is increased from medium-quality to high-quality. Prior to up-sampling, the reference picture 260 includes alternating columns of pixels indicated by Xs, such as column 262, and columns of pixels indicated by 0s, such as column 264. In order to be used as a reference picture for high-quality decoding, the reference picture 260 must be up-sampled by a factor of two in the horizontal direction to create a full sized reference picture. Therefore, each of the original columns of pixels in the reference picture 260 is repeated and the repeated column is inserted immediately after the original column. As such, the repeated columns are interleaved with the original columns. FIG. 9b presents the resulting full sized reference picture 270, which includes two neighboring columns of Xs, such as the original column 262 and the repeated column 272, followed by two neighboring columns of 0s, such as the original column 264 and the repeated column 274.

Similarly, if the decoding quality is increased from low-quality to high-quality, both the top field and the bottom field comprising a reference picture can be up-sampled by four in the horizontal direction and two in the vertical direction to create the full sized reference pictures utilized in high-quality decoding.

In another implementation, up-sampling can be performed by interpolating each newly added row or column of pixels from the adjoining rows or columns of pixels in the smaller reference picture and interleaving the interpolated row or column with the adjoining rows or columns from which it was interpolated. However, while this provides for better picture quality, interpolating the additional rows or columns can introduce delay into the up-sampling process.

Figure 10:
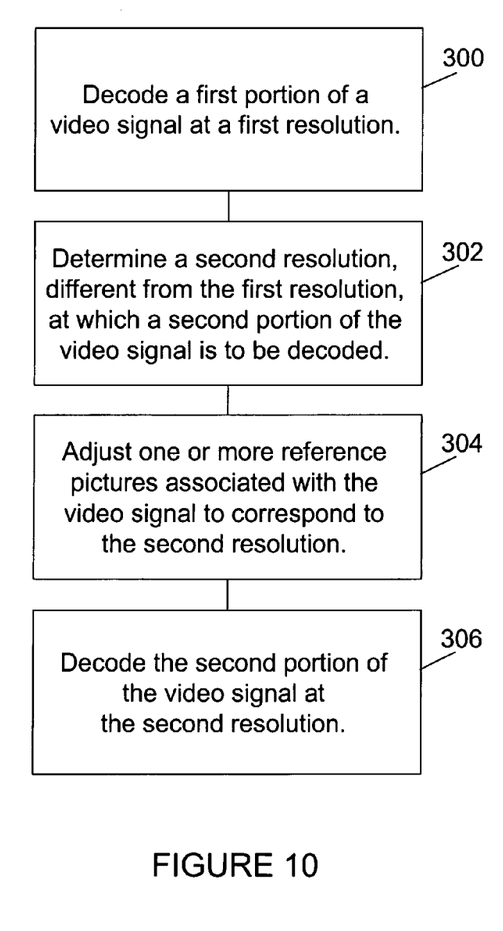
FIG. 10 is a flowchart describing a process for decoding a video signal at reduced resolution.

FIG. 10 describes a method of decoding a video signal at a reduced resolution. In a first step 300, a first portion of a video signal is decoded at a first resolution. In a second step 302 a second resolution, different from the first resolution, is determined at which a second portion of the video signal is to be decoded. In a third step 304, one or more reference pictures associated with the video signal are adjusted to correspond to the second resolution. Once the one or more reference pictures have been adjusted, the fourth step 306 is to decode the second portion of the video signal at the second resolution.

A number of implementations have been disclosed herein. Nevertheless, it will be understood that various modifications may be made without departing from the spirit and scope of the claims. Accordingly, other implementations are within the scope of the following claims.

What is claimed is:

1. A method of varying a decode resolution of a video signal during decoding, the method comprising:
    decoding, using a processor, a first portion of a video signal at a first resolution to generate a first portion of an output signal;
    caching, during said decoding the first portion of the video signal, reference pictures associated with the video signal that have been decoded at the first resolution, the cached reference pictures to be used for decoding subsequent pictures at the first resolution;
    determining, during said decoding the first portion of the video signal, a second resolution, different from the first resolution, at which a second portion of the video signal is to be decoded;
    identifying, using the processor in response to said determining the second resolution, a reference picture from the first portion of the video signal that is required to decode the second portion of the video signal;
    instead of re-decoding the identified reference picture at the second resolution, generating, by the processor, an instance of the identified reference picture at the second resolution at least in part by adjusting a cached instance of the identified reference picture that has been decoded at the first resolution; and
    decoding, using the processor and at least in part based on the instance of the identified reference picture that has been generated at the second resolution, the second portion of the video signal at the second resolution to generate a second portion of the output signal.

2. The method of claim 1, wherein said determining comprises selecting the second resolution from a plurality of predetermined decoding resolutions.

3. The method of claim 2, wherein said determining the second resolution comprises automatically selecting in response to detecting a predetermined condition.

4. The method of claim 3, wherein the predetermined condition is associated with a change in the availability of one or more system resources that occurred during said decoding the first portion of the video signal.

5. The method of claim 2, wherein said selecting the second resolution is performed in response to an input received from a user during said decoding the first portion of the video signal.

6. The method of claim 1, wherein said adjusting further comprises down-sampling the cached instance of the identified reference picture that has been decoded at the first resolution in at least one of a horizontal direction and a vertical direction.

7. The method of claim 1, wherein said adjusting further comprises up-sampling the cached instance of the identified reference picture that has been decoded at the first resolution in at least one of a horizontal direction and a vertical direction.

8. The method of claim 7, wherein said up-sampling further comprises:
  duplicating image information representing a row or a column associated with the cached instance of the identified reference picture that has been decoded at the first resolution; and
  inserting the duplicated image information into the cached instance of the identified reference picture that has been decoded at the first resolution to generate an up-sampled instance of the identified reference picture at the second resolution.

9. The method of claim 7, wherein said up-sampling further comprises:
  interpolating image information representing a row or a column associated with the cached instance of the identified reference picture that has been decoded at the first resolution from a plurality of rows or columns of the cached instance of the identified reference picture; and
  inserting the interpolated image information into the cached instance of the identified reference picture to generate an up-sampled instance of the identified reference picture at the second resolution.

10. The method of claim 1, wherein said adjusting further comprises:
  identifying a resolution associated with the cached instance of the identified reference picture that has been decoded at the first resolution; and
  determining a factor by which the cached instance of the identified reference picture that has been decoded at the first resolution can be adjusted to generate the instance of the identified reference picture at the second resolution.

11. A system for varying a decode resolution of a video signal during decoding, the system comprising processor electronics configured to perform operations comprising:
  decoding a first portion of a video signal at a first resolution to generate a first portion of an output signal;
  caching, during said decoding the first portion of the video signal, reference pictures associated with the video signal that have been decoded at the first resolution, the cached reference pictures to be used for decoding subsequent pictures at the first resolution;
  determining, during said decoding the first portion of the video signal, a second resolution, different from the first resolution, at which a second portion of the video signal is to be decoded;
  identifying, in response to said determining the second resolution, a reference picture from the first portion of the video signal that is required to decode the second portion of the video signal;
  instead of re-decoding the identified reference picture at the second resolution, generating an instance of the identified reference picture at the second resolution at least in part by adjusting a cached instance of the identified reference picture that has been decoded at the first resolution; and
  decoding, and at least in part based on the instance of the identified reference picture that has been generated at the second resolution, the second portion of the video signal at the second resolution to generate a second portion of the output signal.

12. The system of claim 11, wherein the processor electronics are configured to perform operations including selecting the second resolution from a plurality of predetermined decoding resolutions.

13. The system of claim 12, wherein the processor electronics are further configured to perform operations including automatically selecting the second resolution in response to detection of a predetermined condition.

14. The system of claim 13, wherein the predetermined condition is associated with a change in the availability of one or more system resources that occurred during said decoding the first portion of the video signal.

15. The system of claim 12, wherein the processor electronics are further configured to perform operations including selecting the second resolution in response to an input received from a user during said decoding the first portion of the video signal.

16. The system of claim 11, wherein the adjusting comprises down-sampling the cached instance of the identified reference picture that has been decoded at the first resolution in at least one of a horizontal direction and a vertical direction.

17. The system of claim 11, wherein the adjusting comprises up-sampling the cached instance of the identified reference picture that has been decoded at the first resolution in at least one of a horizontal direction and a vertical direction.

18. The system of claim 17, wherein the up-sampling comprises:
  duplicating image information representing a row or a column associated with the cached instance of the identified reference picture that has been decoded at the first resolution; and
  inserting the duplicated image information into the cached instance of the identified reference picture that has been decoded at the first resolution to generate an up-sampled instance of the identified reference picture at the second resolution.

19. The system of claim 17, wherein the up-sampling comprises:
  interpolating image information representing a row or a column associated with the cached instance of the identified reference picture that has been decoded at the first resolution from a plurality of rows or columns of the cached instance of the identified reference picture; and
  inserting the interpolated image information into the cached instance of the identified reference picture to generate an up-sampled instance of the identified reference picture at the second resolution.

20. The system of claim 11, wherein the adjusting comprises:
  identifying a resolution associated with the cached instance of the identified reference picture that has been decoded at the first resolution; and determining a factor by which the cached instance of the identified reference picture that has been decoded at the first resolution can be adjusted to generate the instance of the identified reference picture at the second resolution.

21. A method of varying a decode resolution of a video signal during playback, the method comprising:
    displaying a first portion of a video signal including pictures decoded in accordance with a first resolution;
    caching, during said displaying the first portion of the video signal, reference pictures associated with the video signal that have been decoded at the first resolution, the cached reference pictures to be used for decoding subsequent pictures at the first resolution;
    detecting, during said displaying the first portion of the video signal, an occurrence of a predetermined condition;
    determining in response to the detected occurrence of the predetermined condition a second resolution, wherein the second resolution is different from the first resolution, at which a second portion of the video signal is to be decoded;
    identifying, using a processor in response to said determining the second resolution, a reference picture from the first portion of the video signal that is required to decode the second portion of the video signal;
    instead of re-decoding the identified reference picture at the second resolution, generating, by the processor, an instance of the identified reference picture at the second resolution at least in part by adjusting a cached instance of the identified reference picture that has been decoded at the first resolution; and
    displaying the second portion of the video signal in accordance with the second resolution such that the second portion of the video signal includes pictures decoded at least in part based on the instance of the identified reference picture that has been generated the second resolution.

22. The method of claim 21, wherein said detecting the occurrence of the predetermined condition comprises determining that availability of a system resource has decreased below a level sufficient to decode the video signal at the first resolution in real time.

23. The method of claim 21, further comprising:
    determining a third resolution, wherein the third resolution can differ from the first resolution and the second resolution; and
    decoding and displaying a second video signal in accordance with the third resolution, wherein at least a portion of the first video signal and a portion of the second video signal are decoded and displayed simultaneously.

24. The method of claim 1, further comprising caching, during said decoding the second portion of the video signal, other reference pictures associated with the video signal that have been decoded at the second resolution, the cached other reference pictures to be used for decoding subsequent pictures decoded at the second resolution.

25. The system of claim 11, wherein the processor electronics are further configured to perform operations including caching, during said decoding the second portion of the video signal, other reference pictures associated with the video signal that have been decoded at the second resolution, the cached other reference pictures to be used for decoding subsequent pictures decoded at the second resolution.

* * * * *